United States Patent [19]

Misura et al.

[11] Patent Number: 4,622,376

[45] Date of Patent: Nov. 11, 1986

[54] COMPOSITION OF AROMATIC POLY(ALLYLCARBONATE), STYRENE MATERIALS, AND CROSSLINKER CONTAINING THREE OR MORE ETHYLENICALLY UNSATURATED GROUPS FOR PRODUCING POLYMER OF HIGH REFRACTIVE INDEX AND LOW YELLOWNESS

[75] Inventors: Michael S. Misura, Barberton; Richard A. Schwarz, Akron; Stephanie J. Oates, Canal Fulton, all of Ohio

[73] Assignee: PPG Industries, Inc., Pittsburgh, Pa.

[21] Appl. No.: 749,602

[22] Filed: Jun. 27, 1985

[51] Int. Cl.$^4$ .................... C08F 18/24; C08F 212/30
[52] U.S. Cl. .................... 526/286; 526/292.1; 526/313; 526/314
[58] Field of Search ............ 526/314, 286, 313, 292.1

[56] References Cited

U.S. PATENT DOCUMENTS

| | | | |
|---|---|---|---|
| 2,370,565 | 2/1945 | Muskat et al. | 260/78 |
| 2,384,115 | 9/1945 | Muskat et al. | 260/78 |
| 2,455,652 | 12/1948 | Bralley et al. | 260/77.5 |
| 2,455,653 | 12/1948 | Bralley et al. | 260/77.5 |
| 2,529,866 | 11/1950 | Carlson | 260/77.5 |
| 2,529,867 | 11/1950 | Carlson | 260/77.5 |
| 2,548,141 | 4/1951 | Bralley | 260/77.5 |
| 2,568,658 | 9/1951 | Pope | 260/77.5 |
| 2,587,437 | 2/1952 | Bralley et al. | 260/77.5 |
| 2,587,442 | 2/1952 | Carlson | 260/77.5 |
| 4,369,298 | 1/1983 | Kida et al. | 526/314 |
| 4,487,904 | 12/1984 | Fukuda et al. | 526/301 |
| 4,528,351 | 7/1985 | Tarumi et al. | 526/314 |
| 4,542,201 | 9/1985 | Kanemura et al. | 526/314 |

FOREIGN PATENT DOCUMENTS

| | | |
|---|---|---|
| 1343540 | 10/1963 | France . |
| 59-144736 | 8/1984 | Japan . |
| 59-191708 | 10/1984 | Japan . |
| 60-28412 | 2/1985 | Japan . |
| 564829 | 10/1944 | United Kingdom . |
| 585775 | 2/1947 | United Kingdom . |
| 1264353 | 2/1972 | United Kingdom . |
| 2133023 | 7/1984 | United Kingdom . |
| 2149804 | 6/1985 | United Kingdom . |

OTHER PUBLICATIONS

Synopsis of *Chemical Abstracts* 71(19):90980n, abstracting *J. Prakt. Chem.* 311(4), 656–60 (1969).
*Chemical Abstracts* 102(2):7888d (1985), abstracting DE 3,335,557.
Synopsis of *Chemical Abstracts* 102(11):95414z (1985) abstracting JP 59/144736.
Synopsis of *Chemical Abstracts* 102(14):114751a (1985), abstracting JP 59/191708.
Synopsis of JP 60/28412.

*Primary Examiner*—Joseph L. Schofer
*Assistant Examiner*—Peter F. Kulkosky
*Attorney, Agent, or Firm*—George D. Morris

[57] ABSTRACT

Pourable, polymerizable compositions comprising aromatic-containing poly(allyl carbonate)-functional material, styrenic material, and monomer having three or more allyl, methallyl, acrylyl and/or methacrylyl groups is free radically polymerized to produce polymerizates having high refractive index, high hardness, and low yellowness. The polymerizates are especially useful in the form of ophthalmic lenses.

26 Claims, No Drawings

COMPOSITION OF AROMATIC POLY(ALLYLCARBONATE), STYRENE MATERIALS, AND CROSSLINKER CONTAINING THREE OR MORE ETHYLENICALLY UNSATURATED GROUPS FOR PRODUCING POLYMER OF HIGH REFRACTIVE INDEX AND LOW YELLOWNESS

Aliphatic polyol poly(allyl carbonate) monomer, most notably diethylene glycol bis(allyl carbonate), has for many years been used in producing ophthalmic lenses. Such lenses exhibit low yellowness when undyed, substantial hardness, and refractive indices that are sufficient for many, if not most, ophthalmic applications. There is a need, however, for polymeric lenses of higher refractive indices than those ordinarily provided by polymers of aliphatic polyol poly(allyl carbonate).

This need centers around the desire to reduce the volume of material required to produce a lens of given size, minimum thickness, and optical correction, which volumetric reduction can be achieved through use of polymeric materials having higher refractive indices. It is known that polymers formed from aromatic-containing poly(allyl carbonate)-functional monomer often have higher refractive indices than those formed from aliphatic polyol poly(allyl carbonate) monomer, but the former polymers usually exhibit excessive yellowness and/or insufficient hardness to be widely acceptable for ophthalmic purposes.

The present invention is directed to polymerizates having high refractive index, low yellowness and acceptable hardness, and to pourable, polymerizable compositions which may be free radically polymerized to produce such polymerizates.

Accordingly, one embodiment of the invention is pourable, polymerizable composition comprising (a) aromatic-containing poly(allyl carbonate)-functional material comprising aromatic-containing bis(allyl carbonate)-functional monomer, aromatic-containing poly(allyl carbonate)functional polymer, or a mixture thereof, (b) styrenic material, and (c)polyethylenic-functional monomer containing three or more ethylenically unsaturated groups selected from allyl, methallyl, acrylyl, and methacrylyl.

Another embodiment of the invention is polymerizate produced by free-radically polymerizing the pourable, polymerizable composition of the first embodiment, which polymerizate has a 15-second Barcol hardness of at least zero, a yellowness index at a sample thickness of about 2.2 millimeters of about 4 or lower, and a refractive index at 20° C. and a wavelength of 589.3 nanometers of at least about 1.52.

The term "pourable" as used herein and in the accompanying claims means the viscosity of the composition is sufficiently low that it can be poured into molds commonly used in casting ophthalmic lenses and lens blanks. The temperature of reference is usually ambient temperature, but in some cases slightly elevated temperatures are employed to reduce the viscosity and facilitate pouring. In those instances where the composition contains free-radical initiator, the temperature should ordinarily be below that at which polymerization is initiated. Ordinarily the viscosity of the material is at least as low as about 6000 centipoises at 25° C. In many cases the viscosity is at least as low as about 2000 centipoises at 25° C. Often the viscosity is at least as low as about 500 centipoises at 25° C. It is preferred that the viscosity be at least as low as about 100 centiposes at 25° C.

Aromatic-containing bis(allyl carbonate)-functional monomers which can be utilized in the practice of the present invention are bis(allyl carbonates) of dihydroxy aromatic-containing material. The dihydroxy aromatic-containing material from which the monomer is derived may be one or more dihydroxy aromatic-containing compounds. Preferably the hydroxyl groups are attached directly to nuclear aromatic carbon atoms of the dihydroxy aromatic-containing compounds. The monomers are themselves known and can be prepared by procedures well known in the art. See, for example, U.S. Pat. Nos. 2,370,567; 2,455,652; 2,455,653; and 2,587,437, the disclosures of which are, in their entireties, incorporated herein by reference. In one method, the appropriate allyl alcohol is reacted with phosgene to form the corresponding alkyl chloroformate which is then reacted with the desired dihydroxy aromatic-containing material. In another method the dihydroxy aromatic-containing material is reacted with phosgene to form aromatic-containing bischloroformate which is then reacted with the appropriate allyl alcohol. In a third method, the dihydroxy aromatic-containing material, the appropriate allyl alcohol, and phosgene are mixed together and reacted. In all of these reactions the proportions of reactants are approximately stoichiometric, except that phosgene may be used in substantial excess if desired. The temperatures of the chloroformate-forming reactions are preferably below about 100° C. in order to minimize the formation of undesirable by-products. Ordinarily the chloroformate-forming reaction is in the range of from about 0° C. to about 20° C. The carbonate-forming reaction is usually conducted at about the same temperatures, although higher temperatures may be employed. Suitable acid acceptors, e.g., pyridine, a tertiary amine, an alkali metal hydroxide, or an alkaline earth metal hydroxide may be employed when desired.

The aromatic-containing bis(allyl carbonate)-functional monomers can be represented by the formula:

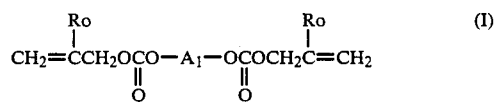

in which $A_1$ is the divalent radical derived from the dihydroxy aromatic-containing material and each $R_o$ is independently hydrogen, halo, or a $C_1$-$C_4$ alkyl group. The alkyl group is usually methyl or ethyl. Examples of $R_o$ include hydrogen, chloro, bromo, fluoro, methyl, ethyl, n-propyl, isopropyl and n-butyl. Most commonly $R_o$ is hydrogen or methyl; hydrogen is preferred. A subclass of the divalent radical $A_1$ which is of particular usefulness is represented by the formula

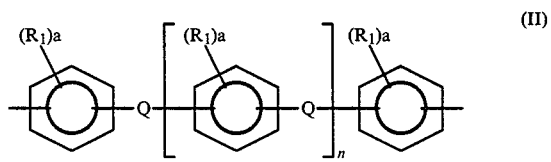

in which each $R_1$ is independently alkyl containing from 1 to about 4 carbon atoms, phenyl, or halo; the average value of each a is independently in the range of from 0 to 4; each Q is independently oxy, sulfonyl, alkanediyl having from 2 to about 4 carbon atoms, or alkylidene having from 1 to about 4 carbon atoms; and the average value of n is in the range of from 0 to about 3. Preferably Q is methylethylidene, viz., isopropylidene.

Preferably the value of n is zero, in which case $A_1$ is represented by the formula

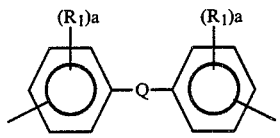 (III)

in which each $R_1$, each a, and Q are as discussed in respect of Formula II. Preferably the two free bonds are both in the ortho or para positions. The para positions are especially preferred.

The dihydroxy aromatic-containing compounds from which $A_1$ is derived may also be polyol-functional chain extended compounds. Examples of such compounds include alkylene oxide extended bisphenols. Typically the alkylene oxide employed is ethylene oxide, propylene oxide, or mixtures thereof. By way of exemplification, when para,para-bisphenols are chain extended with ethylene oxide, the bivalent radical $A_1$ may often be represented by the formula

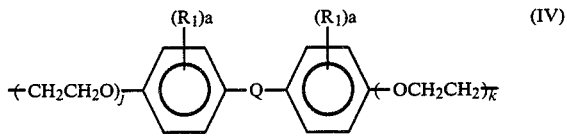 (IV)

where each $R_1$, each a, and Q are as discussed in respect of Formula II, and the average values of j and k are each independently in the range of from about 1 to about 4.

The preferred aromatic-containing bis(allyl carbonate)-functional monomer is represented by the formula

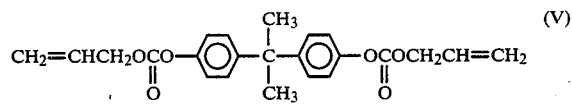 (V)

and is commonly known as bisphenol A bis(allyl carbonate).

Because of the processes by which the aromatic-containing bis(allyl carbonate)-functional monomers are prepared, the monomer product can contain minor amounts of related species. In the case of monomers represented by Formula I, individual related species can be represented by either the formulae

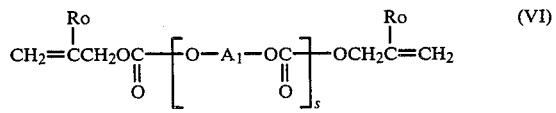 (VI)

or the formula

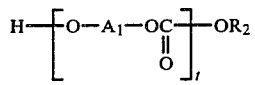 (VII)

wherein each Ro is as discussed above with respect to Formula I, each $A_1$ is independently as discussed with respect to Formula I, $R_2$ is $CH_2=C(Ro)CH_2OC(O)-$ or hydrogen, s is a whole number from 2 to about 5, and t is a whole number from 1 to about 5.

The aromatic-containing bis(allyl carbonate)-functional monomer composition may be purified so as to contain essentially no related species, but this is rarely done. Although the aromatic-containing bis(allyl carbonate)-functional monomer composition may contain only a single related species, it usually contains a mixture of different related species. Typically all of the related species taken together constitute from about 1 to about 20 weight percent of the aromatic-containing bis(allyl carbonate)-functional monomer composition.

As used in the present description and claims, the term aromatic-containing bis(allyl carbonate)-functional monomer, or like names, are intended to mean and include the named monomer and all related species which may be contained therein.

The aromatic-containing poly(allyl carbonate)-functional polymer which is useful in the practice of the present invention is prepared by partially polymerizing aromatic-containing poly(allyl carbonate)-functional monomer to utilize a fraction of the allylic groups without incurring significant gellation. The preferred aromatic-containing poly(allyl carbonate)-functional polymers are those prepared in accordance with the procedures described in detail in application Ser. No. 549,850, filed Nov. 9, 1983, now abandoned, and in copending application Ser. No. 690,411, filed Jan. 10, 1985, the entire disclosures of which are incorporated herein by reference.

In accordance with a method of application Ser. No. 549,850 and application Ser. No. 690,411 aromatic-containing poly(allyl carbonate)-functional monomer is dissolved in a solvent in which the polymer produced from such monomer is also soluble. Preferably, the initiator used to conduct the polymerization is also soluble in the solvent. The resulting liquid solution comprising aromatic-containing poly(allyl carbonate)-functional monomer, solvent and preferably initiator is then partially polymerized, e.g., by heating the liquid solution to polymerization temperatures. The polymerization reaction is allowed to continue until more than 12 percent allylic utilization is attained, i.e., until more than 12 percent of the unsaturated carbon-carbon linkages in the monomer are consumed. The degree of allylic utilization can be controlled by regulating the amount of initiator added to the liquid solution, the temperature at which the partial polymerization is performed, and the ratio of solvent to aromatic-containing poly(allyl carbonate)-functional monomer. Generally, the greater the amount of initiator used, the higher is the allylic utilization. The higher the temperature of polymerization, the lower is the degree of allylic utilization. At constant temperature and employing a given amount of initiator, the higher the ratio of solvent to monomer, the lower is the degree of allylic utilization. Ordinarily however, if at constant temperature the ratio of solvent to monomer is increased and the amount of initiator employed is also sufficiently increased, the reaction can be driven to a higher degree of allylic utilization without the formation of gel than in a system containing less solvent.

In a preferred embodiment of application Ser. No. 549,850 and application Ser. No. 690,411, from about 0.1 to about 1.5 weight percent of initiator, basis the amount of monomer, from about 0.5 to 5 milliliters of solvent per gram of monomer, and polymerization temperatures of from 28° C. to about 100° C. are used. The degree of allylic utilization can be monitored by nuclear magnetic resonance (NMR) and infrared (IR) spectroscopy. The solvent in the resulting composition can be removed by known techniques, e.g., by evaporation or distillation, leaving a viscous liquid comprising a solution of aromatic-containing poly(allyl carbonate)-functional polymer in aromatic-containing poly(allyl carbonate)-functional monomer. This solution is typically a syrupy liquid having a kinematic viscosity (measured with a capillary viscometer) of from at least about 100 centistokes to about 100,000 centistokes, typically from about 1000 to 40,000 centistokes, more typically from about 500 to 2,000 centistokes, measured at 25° C., and a bulk density at 25° C. of from about 1.17 to about 1.23 grams per cubic centimeter. The solution is further characterized by having more than 12 percent allylic utilization, preferably from at least 15 to 50 percent allylic utilization, and, in a particularly preferred exemplification, from about 20 to 50 percent allylic utilization, as determined by infrared spectroscopy (IR) or nuclear magnetic resonance spectroscopy (NMR).

Organic solvents useful in carrying out the solution polymerization are those which are non-reactive chemically with the monomer and resulting polymer, have a boiling temperature substantially below the monomer, i.e., a higher vapor pressure, so as to be easily separated from the monomer by distillation, and which serve as a solvent for the aromatic-containing poly(allyl carbonate)-functional monomer and the resulting liquid aromatic-containing poly(allyl carbonate)-functional polymer (and preferably also the initiator). Useful solvents include the halogenated, e.g., chlorinated, $C_1$-$C_2$ hydrocarbon solvents, i.e., methyl chloride, methylene chloride, ethyl chloride, ethylene dichloride, 1,1,2-trichloro-1,2,2-trifluoroethane, and mixtures thereof. Methylene chloride is preferred because of its high vapor pressure, low boiling point, ease of separation, and relatively low toxicity.

The amount of solvent used in the partial polymerization process should be sufficient to solubilize all of the monomer and to maintain all of the resulting polymer in solution. This is generally from about 0.5 to 5 milliliters of solvent per gram of monomer. Greater amounts of solvent can be used without deleterious effect. Lesser amounts of solvent often result in the formation of an insoluble, infusible, intractable gel when allylic utilization above about 17 percent are employed.

The concentration of initiator useful for the partial polymerization should be sufficient to result in the desired degree of allylic utilization at the conditions used, and generally can vary from 0.1 to about 1.5 weight percent initiator, basis weight of monomer. Greater amounts of initiator may result in either residual initiator in the product or formation of an infusible, insoluble, intractable gel. The initiators useful in carrying out the solution polymerization of the aromatic-containing poly(allyl carbonate)-functional monomer are free radical initiators, e.g., organic peroxides and azo catalysts, and are well known in the art. The preferred free radical initiators are organic peroxy compounds, such as peroxyesters, diacyl peroxides, peroxydicarbonates, and mixtures of such peroxy compounds.

Examples of peroxy compounds include: peroxydicarbonate esters such as di-n-propyl peroxydicarbonate, diisopropyl peroxydicarbonate, di-n-butyl peroxydicarbonate, di-sec-butyl peroxydicarbonate, diisobutyl peroxydicarbonate, di(2-ethylhexyl) peroxydicarbonate, diacetyl peroxydicarbonate, dicyclohexyl peroxydicarbonate, di(4-tert-butylcyclohexyl) peroxydicarbonate, and isopropyl sec-butyl peroxydicarbonate; diacetyl peroxides such as diacetyl peroxide, dibenzoyl peroxide, dilauroyl peroxide, and diisobutyryl peroxide; and peroxyesters such as tertiary-butyl perpivalate, tertiary-butyl peroctoate and tertiary-butyl perneodecanoate.

Only one peroxy compound or a mixture of peroxy compounds may be used as desired.

The solution polymerization is generally carried out at temperatures of from about 28° C. to about 100° C., for from about 1 to about 24 hours. The time and temperature depend on the initiator and the concentration thereof, and the solvent:monomer ratio used.

A wide variety of styrenic materials may be used in the practice of this invention. Ordinarily the styrenic material comprises one or more compounds each being represented by the formula

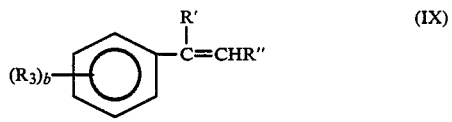

in which each $R_3$ is independently alkyl containing from 1 to about 4 carbon atoms, alkenyl containing from 2 to about 4 carbon atoms, halo, hydroxyl, carboxyl, alkyloxycarbonyl in which the alkyl portion contains from 1 to about 4 carbon atoms, alkoxy containing from 1 to about 4 carbon atoms, trihalomethyl, alkylsulfonyl containing from 1 to about 8 carbon atoms, cycloalkylsulfonyl containing from 3 to about 8 carbon atoms, phenylsulfonyl, alkoxysulfonyl containing from 1 to about 8 carbon atoms, cycloalkyloxysulfonyl containing from 3 to about 8 carbon atoms, or phenoxysulfonyl; in which $R'$ and $R''$ are each independently hydrogen or halo; and in which the value of b is a whole number in the range of from 0 to 5. Although the alkyl, alkenyl, alkyloxycarbonyl, alkoxy, alkylsulfonyl, cycloalkylsulfonyl, phenylsulfonyl, alkoxysulfonyl, cycloalkyloxysulfonyl and phenoxysulfonyl groups employed for $R_3$ are usually unsubstituted, they may contain one or more minor substituents which do not render the styrenic material unsuitable for its intended purpose.

In many cases the styrenic material comprises at least one compound represented by the formula

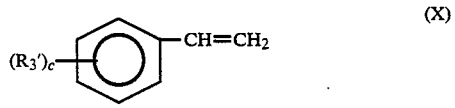

in which $R_3'$ is methyl, vinyl, chloro, or bromo, and the value of c is zero or one.

Examples of styrenic materials that may be used include styrene, o-chlorostyrene, p-chlorostyrene, vinyltoluene, vinylethylbenzene, m-tert-butylstyrene, p-tert-butylstyrene, and divinylbenzene. Of these, styrene, o-chlorostyrene, p-chlorostyrene, and divinylbenzene are preferred. Styrene is particularly preferred.

A wide variety of compounds may be used as the polyethylenic functional monomer containing three or more ethylenically unsaturated groups selected from allyl, methallyl, acrylyl, and methacrylyl. The ethylenically unsaturated groups in the monomer may be the same or they may be different. Examples of suitable polyethylenic-functional monomers include triallyl cyanurate (viz., 2,4,6-tris(allyloxy)-1,3,5-triazine), triallyl isocyanurate (viz., triallyl-1,3,5-triazine-2,4,6(IH, 3H, 5H)trione), triallyl 1,3,5-benzenetricarboxylate, triallyl 1,2,4-benzenetricarboxylate acrylate ester having three or more acrylate groups, methacrylate ester having three or more methacrylate groups, allyl carbonate monomer having three or more allyl carbonate groups, and mixtures thereof. Such monomers are known. Representative of the acrylate esters and the methacrylate esters are the triacrylates and trimethacrylates of glycerol, 1,1,1-trimethylolpropane and trimethylolethane; and the tetraacrylates, tetramethacrylates, triacrylates, and trimethacrylates of pentaerythritol and erythritol. Examples of allyl carbonate monomers having three or more allyl carbonate groups are described in U.S. Pat. No. 4,144,262, the entire disclosure of which is incorporated herein by reference.

The amount of aromatic-containing poly(allyl carbonate)-functional material present in the pourable, polymerizable composition is susceptable to wide variation. Ordinarily the weight ratio of the aromatic-containing poly(allyl carbonate)-functional material to all ethylenically unsaturated material present in the composition is in the range of from about 25:100 to about 98.5:100. Often the weight ratio is in the range of from about 50:100 to about 97:100. A weight ratio in the range of from about 70:100 to about 95:100 is preferred.

Similarly, the amount of styrenic material present in the pourable, polymerizable composition may be widely varied. Generally the weight ratio of the styrenic material to all ethylenically unsaturated material present in the composition is in the range of from about 1:100 to about 20:100. Typically the weight ratio is in the range of from about 2:100 to about 18:100. A weight ratio in the range of from about 4:100 to about 12:100 is preferred.

The amount of polyethylenic-functional monomer containing three or more ethylenically unsaturated groups selected from allyl, methallyl, acrylyl, and methacrylyl, present in the pourable, polymerizable composition may also be varied considerably. In most cases the weight ratio of such polyethylenic-functional monomer to all ethylenically unsaturated material present in the composition is in the range of from about 0.5:100 to about 25:100. Often the weight ratio is in the range of from about 0.5:100 to about 15:100. A weight ratio in the range of from about 2:100 to about 10:100 is preferred.

There are many materials which may optionally be present in the pourable, polymerizable composition.

Preferably the pourable, polymerizable composition further comprises one or more of the following: (c) non-aromatic bis(allyl carbonate)-functional monomer, (d) non-aromatic poly(allyl carbonate)-functional polymer, (e) non-aromatic diester represented by the formula:

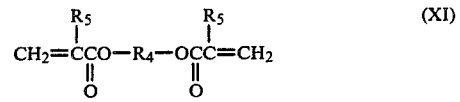

where $R_4$ is an aliphatic divalent organo group, a cycloaliphatic divalent organo group, or a divalent organo group consisting of at least one divalent aliphatic portion and at least one divalent cycloaliphatic portion, and where each $R_5$ is independently hydrogen, halo, or an alkyl group containing from 1 to about 4 carbon atoms, (f) monofunctional acrylate represented by the formula:

where $R_6$ is a monovalent organo group and $R_7$ is hydrogen, halo, or an alkyl group containing from 1 to about 4 carbon atoms, (g) phthalic anhydride, and (h) aromatic diester represented by the formula

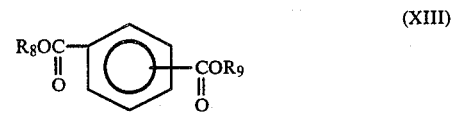

where $R_8$ and $R_9$ are each independently allyl, alkyl or aralkyl.

Non-aromatic bis(allyl carbonate)-functional monomers which can be utilized in the practice of the present invention are bis(allyl carbonates) of linear or branched aliphatic glycols, cycloaliphatic glycols, or glycols containing at least one divalent aliphatic portion and at least one divalent cycloaliphatic portion. These monomers can be prepared by procedures well known in the art, for example, those described in U.S. Pat. Nos. 2,370,567 and 2,403,113, the entire disclosures of which are incorporated herein by reference. In the latter patent, the monomers are prepared by treating the non-aromatic glycol with phosgene at temperatures between 0° C. and 20° C. to form the corresponding bischloroformate. The bischloroformate is then reacted with an unsaturated alcohol in the presence of a suitable acid acceptor, as for example, pyridine, a tertiary amine, or an alkali or alkaline earth metal hydroxide. Alternatively, the unsaturated alcohol can be reacted with phosgene and the resulting chloroformate reacted with the non-aromatic glycol in the presence of an alkaline reagent, as described in U.S. Pat. No. 2,370,567.

The non-aromatic bis(allyl carbonate)-functional monomers can be represented by the formula

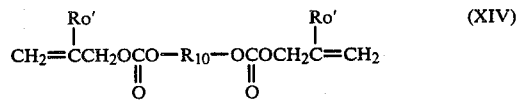

in which $R_{10}$ is the divalent radical derived from the non-aromatic glycol and each $R_o'$ is independently hydrogen, halo, or an alkyl group containing from 1 to about 4 carbon atoms. The alkyl group is usually methyl or ethyl. Examples include those previously discussed in respect of Ro of Formula I. Most commonly Ro' is hydrogen or methyl; hydrogen is preferred.

The aliphatic glycol from which the non-aromatic bis(allyl carbonate)-functional monomer may be derived, can be linear or branched and contain from 2 to about 10 carbon atoms. Commonly, the aliphatic glycol is an alkylene glycol having from 2 to 4 carbon atoms or a poly($C_2$–$C_4$) alkylene glycol. Examples of such compounds include ethylene glycol, propylene glycol, 1,3-propanediol, 1,4-butanediol, 1,3-butanediol, 1,5-pentanediol, 1,6-hexanediol, 1,8-octanediol, 2-ethylhexyl-1,6-diol, 1,10-decanediol, diethylene glycol, triethylene glycol tetraethylene glycol, $HOCH_2CH_2CH_2OCH_2CH_2CH_2OCH_2CH_2CH_2OH$, dipropylene glycol, tripropylene glycol, and tetrapropylene glycol. Other examples include alkylene carbonate and alkylene ether carbonate diols such as $HOCH_2CH_2O$—$CO$—$OCH_2CH_2OH$ and $HOCH_2CH_2OCH_2CH_2O$—$CO$—$CH_2CH_2CH_2CH_2OH$.

The cycloaliphatic glycols from which the non-aromatic bis(allyl carbonate)-functional monomer may be derived, usually contain from about 5 to about 8 carbon atoms. Ordinarily, the cycloaliphatic glycol contains from about 6 to about 8 carbon atoms. Examples include 1,3-cyclopentanediol, 1,2-cyclohexanediol, 1,3-cyclohexanediol, 1,4-cyclohexanediol and 1,5-cyclooctanediol.

Examples of glycols containing at least one divalent aliphatic portion and at least one cycloaliphatic portion which may be used include 4,4'-methylenebis(cyclohexanol), 4,4'-(1-methylethylidene)bis(cyclohexanol), and 2,2'-(1,4-cyclohexanediyl)bisethanol.

The non-aromatic glycol from which the non-aromatic bis(allyl carbonate)-functional monomers are derived may also be aliphatic diol-functional chain extended compounds. Examples of such compounds based on alkylene oxide extension include ethylene oxide extended trimethylolpropane, propylene oxide extended trimethylolpropane, ethylene oxide extended glycerol, and propylene oxide extended glycerol.

Preferably, the non-aromatic bis(allyl carbonate)-functional monomer is aliphatic bis(allyl carbonate)-functional monomer. Most commonly, $R_{10}$ is —$CH_2CH_2$—, —$CH_2CH_2$—$O$—$CH_2CH_2$—, or —$CH_2CH_2$—$O$—$CH_2CH_2$—$O$—$CH_2CH_2$—.

Specific examples of aliphatic bis(allyl carbonate)-functional monomers useful in the practice of the invention herein contemplated include ethylene glycol bis(2-chloroallyl carbonate), ethylene glycol bis(allyl carbonate), 1,4-butanediol bis(allyl carbonate), 1,5-pentanediol bis(allyl carbonate), 1,6-hexanediol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propanediol bis(allyl carbonate, 1,3-butanediol bis(allyl carbonate), 1,4-butanediol bis(2-bromoallyl carbonate), dipropylene glycol bis(allyl carbonate), trimethylene glycol bis(2-ethylallyl carbonate), and pentamethylene glycol bis(allyl carbonate).

A preferred class of aliphatic bis(allyl carbonate)-functional monomers is represented by the graphic formula,

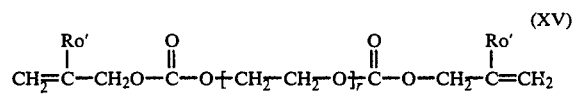

wherein Ro' is hydrogen, halo, or $C_1$–$C_4$ alkyl, and the average value of r is in the range of from about 1 to about 3. Ro' is preferably hydrogen.

Industrially important aliphatic bis(allyl carbonate)-functional monomers which can be utilized in the invention herein contemplated are:

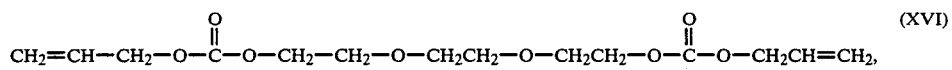

Triethylene Glycol bis(Allyl Carbonate)

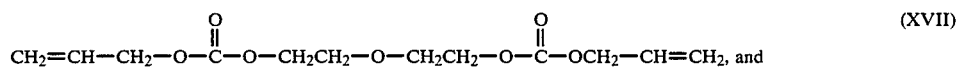

Diethylene Glycol bis(Allyl Carbonate)

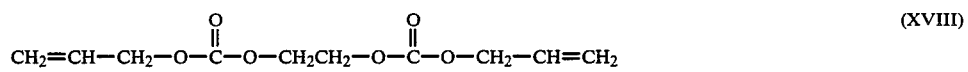

Ethylene Glycol bis(Allyl Carbonate)

Diethylene glycol bis(allyl carbonate) is preferred. This monomer is commercially available from PPG Industries, Inc. and is sold under the trademark CR-39 Allyl Diglycol Carbonate.

Because of the process by which the non-aromatic bis(allyl carbonate)-functional monomer is prepared, i.e., by phosgenation of the glycol (or allyl alcohol) and subsequent esterification by the allyl alcohol (or glycol), the monomer product can contain related species. In the case of non-aromatic diol bis(allyl carbonate), individual related monomer species can be represented by either the formula:

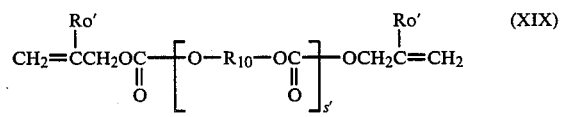

or the formula

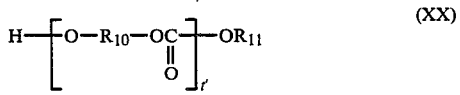

wherein each Ro' is as discussed above with respect to Formula XIV, each $R_{10}$ is independently as discussed with respect to Formula XIV, $R_{11}$ is $CH_2$=$C(Ro')CH_2OC(O)$— or hydrogen, s' is a whole number from 2 to about 5, and t' is a whole number from 1 to about 5. Individual related species associated with diethylene glycol bis(allyl carbonate) can be represented by either the formula:

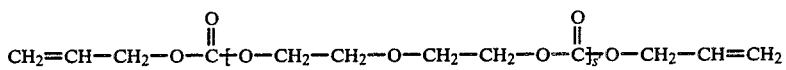

(XXI)

or by the formula:

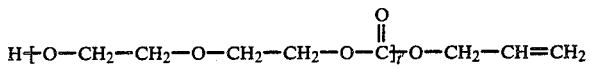

(XXII)

wherein s' is a whole number from 2 to about 5, and t' is a whole number from 1 to about 5.

The non-aromatic bis(allyl carbonate)-functional monomer composition may be purified so as to contain essentially no related species, but this is rarely done. Although the non-aromatic bis(allyl carbonate)-functional monomer composition may contain only a single related species, it usually contains a mixture of different related species. Typically all of the related species taken together constitute from about 1 to about 20 weight percent of the non-aromatic bis(allyl carbonate)-functional monomer composition.

As used in the present description and claims, the term non-aromatic bis(allyl carbonate)-functional monomer or like names, e.g., diethylene glycol bis(allyl carbonate), are intended to mean and include the named monomer and all related species which may be contained therein.

The amount of non-aromatic bis(allyl carbonate)-functional monomer present in the pourable, polymerizable composition may be widely varied. When it is used, the right ratio of the non-aromatic bis(allyl carbonate)-functional monomer to all ethylenically unsaturated material present in the composition is ordinarily in the range of from about 0.1:100 to about 20:100. Often the weight ratio is in the range of from about 1:100 to about 15:100. A weight ratio in the range of from about 2:100 to about 10:100 is preferred.

The non-aromatic poly(allyl carbonate)-functional polymer which is useful in the practice of the present invention is prepared by partially polymerizing non-aromatic poly(allyl carbonate)-functional monomer to utilize a fraction of the allylic groups without incurring significant gellation. The preferred non-aromatic poly(allyl carbonate)-functional polymers are those prepared in accordance with the procedures described in detail in application Ser. No. 549,850, filed Nov. 9, 1983, and now abandoned, and in copending application Ser. No. 690,411, filed Jan. 10, 1985. The preparation is analogous to the preparation of the aromatic-containing poly(allyl carbonate)-functional polymer, except that non-aromatic poly(allyl carbonate)-functional monomer is used rather than aromatic-containing poly(allyl carbonate)-functional monomer. Following partial polymerization, the solvent in the composition can be removed by known techniques, e.g., by evaporation or distillation, leaving a viscous liquid comprising a solution of non-aromatic poly(allyl carbonate)-functional polymer in aliphatic poly(allyl carbonate)-functional monomer. The solution is typically a pourable, syrupy liquid having a kinematic viscosity (measured with a capillary viscometer) of from at least about 100 centistokes to about 100,000 centistokes, typically from about 1000 to 40,000 centistokes, more typically from about 500 to 2,000 centistokes, measured at 25° C., and a bulk density at 25° C. of from about 1.17 to about 1.23 grams per cubic centimeter. The solution is further characterized by having more than 12 percent allylic utilization, preferably from at least 15 to 50 percent allylic utilization, and, in a particularly preferred exemplification, from about 20 to 50 percent allylic utilization, as determined by IR or NMR analysis. IR analysis is preferred.

According to one exemplification, a liquid mixture comprising 100 grams of diethylene glycol bis(allyl carbonate), 300 milliliters of methylene chloride and 1.1 milliliters of diisopropyl peroxydicarbonate was prepared. The liquid mixture was placed in a bottle and the bottle was purged with argon for 3 minutes. The bottle and its contents were held at 70° C. for 18 hours and then cooled to 25° C. The liquid reaction mixture was placed in a one-liter round bottom flask and vacuum stripped at 50° C. for 2 hours. Then the temperature was raised to 60° C. for 1 hour and the pressure lowered until an absolute pressure of 267 pascals was obtained. The residue remaining after vacuum stripping was a solution of aliphatic poly(allyl carbonate)-functional polymer in diethylene glycol bis(allyl carbonate) monomer and had a viscosity of 1900 centiposes and an allylic utilization of 34 percent.

The amount of non-aromatic poly(allyl carbonate)-functional polymer present in the polymerizable composition may be widely varied. When it is used, the weight ratio of the non-aromatic poly(allyl carbonate)-functional polymer to all ethylenically unsaturated material present in the composition is ordinarily in the range of from about 0.1:100 to about 20:100. Often the weight ratio is in the range of from about 1:100 to about 15:100. A weight ratio in the range of from about 2:100 to about 10:100 is preferred.

Another material which may be present is non-aromatic diester represented by Formula XI, previously described. These diesters are esterification products of non-aromatic glycols with one or more acrylic acids. They are known compounds and may be prepared by well known esterification procedures.

The preferred non-aromatic diester is represented by the formula:

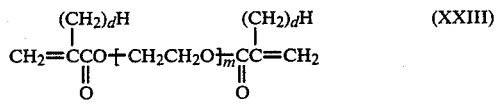

(XXIII)

where the average value of m is in the range of from 1 to about 20, and the average value of d is in the range of from 0 to 1. In Formula XXIII, the average value of m is preferably in the range of from about 2 to about 6. Usually the average value of d is either 0 or 1; preferably the average value of d is 1.

The amount of the non-aromatic diester present in the pourable, polymerizable composition may also be widely varied. When it is used, the weight ratio of the non-aromatic diester to all ethylenically unsaturated material present in the composition is generally in the range of from about 0.1:100 to about 20:100. Typically the weight ratio is in the range of from about 1:100 to about 15:100. A weight ratio in the range of from about 2:100 to about 10:100 is preferred.

The monofunctional acrylates represented by Formula XII are themselves well known compounds. The monovalent organo group, $R_6$ may be aliphatic, cycloaliphatic, a monovalent organo group containing at least one cycloaliphatic portion and at least one aliphatic portion, or an aromatic-containing monovalent organo group. Most often $R_6$ is alkyl containing from 1 to about 4 carbon atoms, cycloalkyl containing from 5 to about 8 carbon atoms, phenyl, and benzyl. It is preferred that $R_6$ be methyl, ethyl, cycloalkyl, phenyl, or benzyl. $R_7$ is usually hydrogen or methyl. Examples of monofunctional acrylates include: methyl acrylate, methyl methacrylate, ethyl methacrylate, butyl methacrylate, isobutyl methacrylate, cyclohexyl methacrylate, phenyl methacrylate, and benzyl methacrylate. The methacrylic acid esters, as for example methyl methacrylate, are preferred.

The monofunctional acrylate may comprise only one monofunctional acrylate compound or it may comprise a plurality of monofunctional acrylate compounds.

The amount of monofunctional acrylate present in the pourable, polymerizable composition may be varied considerably. When the monofunctional acrylate is used, the weight ratio of the monofunctional acrylate to all ethylenically unsaturated material present in the composition is ordinarily in the range of from about 0.1:100 to about 25:100. Often the weight ratio is in the range of from about 1:100 to about 15:100. A weight ratio in the range of from about 2:100 to about 10:100 is preferred.

The amount of phthalic anhydride present in the pourable, polymerizable composition is susceptible to considerable variation. When phthalic anhydride is used the weight ratio of the phthalic anhydride to all ethylenically unsaturated material present in the composition is generally in the range of from about 0.05:100 to about 5:100. In many cases the weight ratio is in the range of from about 0.1:100 to about 3.5:100. A weight ratio in the range of from about 0.5:100 to about 2:100 is preferred.

Another material which may be present is aromatic diester represented by Formula XIII, previously described. These aromatic diesters are esterification products of phthalic anhydride, phthalic acid, isophthalic acid, and/or terephthalic acid with allyl alcohol and/or alkanol. They are known compounds and may be prepared by well known esterification procedures. Phthalates are preferred. In Formula XIII, $R_8$ and $R_9$ are usually each independently allyl or alkyl containing from 1 to about 8 carbon atoms. It is preferred that $R_8$ and $R_9$ be the same. The preferred compound is diallyl phthalate.

The amount of the aromatic diester present in the pourable, polymerizable composition may be widely varied. When it is used, the weight ratio of the aliphatic diester to all ethylenically unsaturated material present in the composition is generally in the range of from about 0.1:100 to about 25:100. Often the weight ratio is in the range of from about 0.1:100 to about 15:100. A weight ratio in the range of from about 0.2:100 to about 10:100 is preferred.

One or more ethylenically unsaturated monomers not heretofore discussed may optionally be present in the pourable, polymerizable composition of the invention. Illustrative of such monomers are alkyl esters of ethylenically unsaturated dicarboxylic acids, cycloalkyl esters of ethylenically unsaturated dicarboxylic acids, allyl esters of saturated or ethylenically unsaturated dicarboxylic acids, vinyl esters of saturated monocarboxylic acids, and vinyl benzoate. When used, the weight ratio of these materials to all ethylenically unsaturated material present in the composition is usually in the range of from about 0.1:100 to about 15:100. A weight ratio in the range of from about 0.1:100 to about 10:100 is preferred.

The alkyl esters of ethylenically unsaturated dicarboxylic acids are usually the esters of alkanol containing from 1 to about 4 carbon atoms and ethylenically unsaturated dicarboxylic acids containing from 4 to about 6 carbon atoms. The alcohols include methanol, ethanol, propanol, isopropanol and the butanols. As the ethylenically unsaturated acids there can be mentioned maleic, fumaric, itaconic, citraconic, ethylmaleic and mesaconic acids. Examples of such esters include dimethyl maleate, diethyl maleate, methyl ethyl maleate, dimethyl fumarate, diethyl fumarate, and methyl ethyl fumarate. Dimethyl maleate and dimethyl fumarate are preferred.

The cycloalkyl esters of ethylenically unsaturated dicarboxylic acids are typically esters of cyclopentanol or cyclohexanol and ethylenically unsaturated dicarboxylic acids containing from 4 to about 6 carbon atoms. Examples include dicyclohexyl maleate and dicyclohexyl fumarate.

Examples of allyl esters of saturated or ethylenically unsaturated dicarboxylic acids include diallyl succinate, diallyl glutarate, diallyl adipate, diallyl suberate, diallyl maleate, and diallyl fumarate.

Vinyl esters of saturated lower monocarboxylic acids are also contemplated. Examples include vinyl formate, vinyl acetate, and vinyl propionate.

When, as is preferred, polymerization of the polymerizable composition is initiated by thermally generated free radicals, the polymerizable composition contains initiator. The initiators which may be used in the present invention may be widely varied, but in general they are thermally decomposable to produce radical pairs. One or both members of the radical pair are available to initiate addition polymerization of ethylenically unsaturated groups in the well-known manner.

The preferred initiators are peroxy initiators. Examples of suitable peroxy initiators include those represented by any of the following formulae:

(XXIV)

(XXV)

(XXVI)

(XXVII)

wherein $R_{12}$ and $R_{13}$ are each individually phenyl, phenylalkyl in which the alkyl portion is straight or branched and contains from 1 to about 10 carbon atoms, straight alkyl containing from 1 to about 20 carbon atoms, branched alkyl containing from 3 to about 20 carbon atoms, cycloalkyl containing from about 5 to about 12 carbon atoms, or polycycloalkyl containing from about 7 to about 12 carbon atoms. The specific groups used for $R_{12}$ and $R_{13}$ may be the same or they may be different.

It is to be understood that unless otherwise qualified, either expressly or contextually, any of the above groups may be substituted with one or more minor substituents so long as their numbers and identities do not render the initiator unsuitable for its intended purpose. Halo groups, alkoxy groups containing from 1 to about 4 carbon atoms, haloalkyl groups containing from 1 to about 4 carbon atoms, and polyhaloalkyl groups containing from 1 to about 4 carbon atoms, are examples of substituents which may be used. Alkyl groups containing from 1 to about 4 carbon atoms may be used as substituents on non-aliphatic groups or on non-aliphatic portions of complex groups.

The phenylalkyl groups used for $R_{12}$, $R_{13}$, or both $R_{12}$ and $R_{13}$ often contain from 1 to about 4 carbon atoms in the alkyl portion. Benzyl and phenylethyl are preferred.

The branched alkyl groups often have at least one branch in the 1-position or the 2-position. In many cases each branched alkyl group contains from 3 to about 8 carbon atoms. Preferably, each branched alkyl group contains 3 or 5 carbon atoms.

Examples of branched alkyl groups that may be used include isopropyl, secondary butyl, isobutyl, tertiary butyl, 1-methylbutyl, 2-methylbutyl, tertiary pentyl, 1,2-dimethylpropyl, neopentyl, 1-methylpentyl, 2-methylpentyl, 1,1-dimethylbutyl, 1,2-dimethylbutyl, 1,3-dimethylbutyl, 2,2-dimethylbutyl, 1-ethylbutyl, 2-ethylbutyl, 2-ethylhexyl, 2,4,4-trimethylpentyl, and 1-ethyldecyl. Preferred are secondary butyl, tertiary butyl, and neopentyl.

The cycloalkyl often contains from about 5 to about 8 carbon atoms.

Examples of cycloalkyl groups include cyclopentyl, cyclohexyl, cycloheptyl, cyclooctyl, cyclodecyl, and cyclododecyl. Cyclohexyl is preferred.

The polycycloalkyl typically contains from about 7 to about 10 carbon atoms.

Examples of polycycloalkyl groups that may be used include 1-norbornyl, 2-bornyl, and 1-adamantyl.

Exemplary peroxy initiators include those described above in respect of the preparation of liquid aromatic-containing poly(allyl carbonate) polymer. Diisopropyl peroxydicarbonate and benzoyl peroxide are the preferred initiators.

Other examples of suitable peroxy initiators include monoperoxycarbonates represented by the following formula:

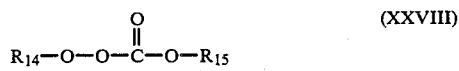

(XXVIII)

wherein $R_{14}$ is a tertiary $C_4$–$C_5$ alkyl, e.g., tertiary butyl and tertiary amyl, and $R_{15}$ is a $C_3$–$C_7$ alkyl. Examples of alkyl radicals representative of $R_{15}$ include: isopropyl, n-propyl, isobutyl, secondary butyl, n-butyl, secondary amyl, isoamyl, n-amyl, secondary hexyl, isohexyl, n-hexyl, n-heptyl and 2,4-dimethyl-3-pentyl. Preferred as $R_{15}$ are secondary $C_3$–$C_7$ alkyls such as isopropyl, secondary butyl, and 2,4-dimethyl-3-pentyl. Particularly preferred monoperoxycarbonates are tertiary-butylperoxy isopropyl carbonate and tertiary-amylperoxy isopropyl carbonate.

Only one initiator or a plurality of initiators may be used as desired.

When used, the amount of initiator present in the pourable, polymerizable composition may be widely varied. Ordinarily the weight ratio of the initiator to all ethylenically unsaturated material present in the composition is in the range of from about 0.5:100 to about 7:100. In many cases the weight ratio is in the range of from about 1:100 to about 5:100. A weight ratio in the range of from about 2:100 to about 4:100 is preferred.

It will be recognized by those skilled in the art that the most preferred weight ratios of initiator will depend upon the nature of the initiator used (its active oxygen content) as well as the nature and ratios of the variously ethylenically unsaturated materials present in the composition.

Another material which may optionally be present in the pourable polymerizable composition is mold release agent. When used, the mold release agent is employed in the polymerizable composition in amounts sufficient to ensure an intact, that is, unbroken and uncracked, casting which releases easily from the mold. The mold release agent should be compatible with the pourable, polymerizable composition and not adversely affect the physical properties of the casting. More particularly, the mold release agent should not adversely affect the physical properties most characteristic of the polymerizate such as its rigidity, hardness, index of optical refraction, transmission of visible light and absence of coloring which affects optical clarity. The mold release agent should, therefore, be a liquid or, if a solid, be soluble in the polymerizable composition.

Mold release agents that may be used include alkyl phosphates and stearates. Among the alkyl phosphates that may be used as a mold release agent are the mono and dialkyl phosphates (and mixtures of mono and dialkyl phosphates) which are commercially available from E. I. DuPont de Nemours & Co. under the trade names ORTHOLEUM ® 162 and ZELEC ® UN. These alkyl phosphates are reported to have straight chain alkyl groups of from 16 to 18 carbon atoms.

Other mold release agents that may be used include stearic acid and the metal salts of stearic acid, e.g., stearic acid salts of the metals zinc, calcium, lead, magnesium, barium, cadmium, aluminum, and lithium. Other fatty acids and fatty acids salts may also be used, provided that they do not adversely effect the physical properties of the casting. Other mold release agents known to the art may be used.

When used, the mold release agent is ordinarily present in the pourable, polymerizable composition in an amount between about 1 and about 2000 parts by weight of mold release agent per million parts by weight of all ethylenically unsaturated material present (PPM). In many cases, between about 20 and about 200 PPM is used. Between about 25 and about 100 PPM is preferred.

Dyes and/or pigments are optional materials that may be present when high transmission of light is not necessary.

The listing of optional ingredients discussed above is by no means exhaustive. These and other ingredients may be employed in their customary amounts for their customary purposes so long as they do not seriously interfere with good polymer formulating practice.

In the polymerizable composition, the ethylenically unsaturated material should be in the form of a solution in the proportions used. Insoluble optional materials, such as for example pigments, while not preferred, may also be present.

The pourable polymerizable compositions of the invention are usually prepared by admixing the various ingredients. Mixing may be accompanied with heating when it is desirable to hasten dissolution of any of the ingredients. However, if initiator is present during heating, the temperature should ordinarily be maintained below that at which polymerization is initiated. It is preferred to employ heating in the absence of initiator, to cool the resulting solution, and then to introduce the initiator and other ingredients which enter the solution without undue difficulty.

The pourable, polymerizable compositions of the invention can be free-radically polymerized (viz., cured) by the known conventional techniques for polymerizing (allyl carbonate)-containing compositions to form solid, crosslinked polymer.

Preferably, polymerization is accomplished by heating the polymerizable composition to elevated temperatures in the presence of free-radical initiator. Typically polymerization is conducted at temperatures in the range of from about 28° C. to about 100° C. In many cases post curing, that is, heating beyond the time thought necessary to substantially fully polymerize the composition is employed. The post cure is often carried out above about 100° C., but below the temperatures at which thermal degredation provides undesirable yellowness, e.g., about 125° C., and preferably for a time sufficient to attain either substantially constant or maximum Barcol hardness. For example, when the cure cycle shown in Table 2 below is followed, the polymerizate may be maintained at 100° for an additional 1 to 4 hours or more. Although not wishing to be bound by any theory, the additional 1 to 4 hours of post cure is believed to decompose, primarily by initiation and chain termination, from 83 percent to 99.9 percent of the peroxide initiator remaining unreacted at the end of the normal 18 hour cure cycle. Moreover, the additional 1 to 4 hours of cure often increases the Barcol Hardness by about 5 to 8 units.

In most cases, the pourable, polymerizable composition is conformed to the shape of the final solid polymerized article before polymerization. For example, the composition can be poured onto a flat surface and heated, whereby to effect polymerization and form a flat sheet or coating. According to a still further exemplification, the polymerizable composition is placed in molds, as for instance glass molds, and the molds heated to effect polymerization, thereby forming shaped articles such as lens blanks or ophthalmic lenses. In a particularly preferred embodiment, the composition is poured into a lens mold and polymerized therein to produce an ophthalmic lens.

A wide variety of cure cycles, that is, time-temperature sequences, may be used during polymerization. Ordinarily the cure cycle employed is based upon a consideration of several factors including the size of the coating, the identity of the initiator, and the reactivity of the ethylenically unsaturated material. For casting ophthalmic lenses or lens blanks, several standard cure cycles have been developed and these are shown in Tables 1–4. These standard cure cycles are useful in forming polymerizates according to the present invention, but they are, however, only exemplary, and others may be used.

TABLE 1

Standard Cure Cycle for Diisopropyl Peroxydicarbonate

| Cumulative Hours | Oven Temperature, °C. |
|---|---|
| 0 | 44 |
| 2 | 46 |
| 4 | 48 |
| 6 | 50 |
| 8 | 54 |
| 10 | 58 |
| 12 | 64 |
| 14 | 69 |
| 16 | 85 |
| 17 | 105 (End of Cycle.) |

TABLE 2

Standard Eighteen Hour Cure Cycle for Benzoyl Peroxide

| Cumulative Hours | Oven Temperature, °C. |
|---|---|
| 0 | 63 |
| 2 | 63 |
| 4 | 65 |
| 6 | 67 |
| 8 | 77 |
| 10 | 80 |
| 12 | 85 |
| 14 | 88 |
| 16 | 92 |
| 18 | 100 (End of Cycle.) |

TABLE 3

Standard Five Hour Cure Cycle for Benzoyl Peroxide

| Cumulative Hours | Oven Temperature, °C. |
|---|---|
| 0 | 90 |
| 1 | 90 |
| 2 | 90 |
| 3 | 90 |
| 3.5 | 96 |
| 4 | 103 |
| 4.5 | 109 |
| 5 | 115 (End of Cycle.) |

TABLE 4

Standard Cure Cycle for Tertiary-Butylperoxy Isopropyl Carbonate

| Cumulative Hours | Oven Temperature, °C. |
|---|---|
| 0 | 90 |
| 2 | 91 |
| 4 | 92 |
| 6 | 93 |
| 8 | 95 |
| 10 | 97 |
| 12 | 100 |
| 14 | 103 |
| 16 | 110 |
| 17 | 120 (End of Cycle.) |

The polymerizates of the present invention, on an undyed, untinted, and unpigmented basis, not only have high refractive indices, but they also exhibit low yellowness and 15-second Barcol hardness values which are acceptable for ophthalmic purposes. Prior to the present invention, the achievement of all three properties concurrently in a polymerizate was accomplished only with difficulty, if at all.

The present polymerizates have 15-second Barcol hardnesses of at least zero. In many cases the Barcol hardness is at least about 15, and preferably it is at least about 25. As used herein, 15-second Barcol hardness is determined in accordance with ASTM Test Method D 2583-81 using a Barcol Impressor and taking scale readings 15 seconds after the impressor point has penetrated the specimen.

The present polymerizates on an undyed, untinted, and unpigmented basis, also have yellowness indices at a sample thickness of about 2.2 millimeters of about 4 or lower. Often the yellowness index is about 2.5 or lower. Preferably, the yellowness index is about 1.5 or lower. As used herein, yellowness index is determined on specimens having a thickness of about 2.2 millimeters in accordance with ASTM Test Method D 1925-70 (Reapproved 1977) using a Hunterlab Tristimulus Colorimeter Model D25P employing a collimated Illumanant C standard light source.

The present polymerizates also have refractive indices at 20° C. and a wavelength of 589.3 nanometers of at least about 1.52. Often the refractive index under the same conditions is at least about 1.53. Preferably it is at least about 1.55.

In many cases the polymerizates of the present invention, on an undyed, untinted, unpigmented basis, also exhibit one or more other favorable properties. Among these favorable properties may be mentioned high luminous transmission, low haze, a density of about 1.3 grams per cubic centimeter or lower, passage of the ball drop test, relative ease in dyeability, high resistance to attack by acetone, low heat distortion and the ability to be easily machined.

As used herein luminous transmission and haze value are determined on specimens having a thickness of about 2.2 millimeters in accordance with ASTM Test Method D 1003-61 (Reapproved 1977) using a Hunterlab Tristimulus Colorimeter Model D25P employing a collimated Illuminant C standard light source.

In most cases the luminous transmission of the present polymerizates on an undyed, untinted, unpigmented basis, is at least about 80 percent. Frequently the luminous transmission is at least about 85 percent. Preferably the luminous transmission is at least about 90 percent. When the polymerizate is dyed, tinted, or pigmented for use in sunglasses or filters, the luminous transmission of the dyed, tinted, and/or pigmented sample is usually at least about 20 percent.

Often the haze value of the polymerizates, on an undyed, untinted, unpigmented basis are about 5 percent or lower. In many cases the haze value is about 4 percent or lower, and preferably it is about 2 percent or lower.

The density of most of the polymerizates of the invention is usually about 1.3 grams per cubic centimeter (g/cm$^3$) or lower. Frequently the density is about 1.27 g/cm$^3$ or lower, and preferably it is about 1.25 g/cm$^3$ or lower. As used herein, density is determined in accordance with ASTM Test Method C729-75 and reported for a temperature of 25° C.

The ball drop test is conducted as described in ANSI Standard Z80.1-1979, in which the ball is dropped from a height of 127 centimeters. To pass the test, the specimen, which is a lens or in the shape of a lens, must not fracture. For purposes of the test, the specimen will be considered to have fractured if it cracks through its entire thickness and across a complete diameter into two or more separate pieces, or if any specimen material visible to the naked eye becomes detached from the specimen surface.

The Bayer abrasion test is conducted as described in ASTM Standard Test Method F735-81. When the test is conducted on lenses rather than flat plates, a plate which will maintain the test lens or both the test lens and a standard lens in position in the cradle is used. It is preferred that the polymerizates of the invention have a Bayer abrasion resistance at least as great as that of Plexiglas ® poly(methyl methacrylate).

The heat distortion test is conducted as described in ASTM Standard Test Method D 648-72. Preferably the heat distortion temperature of the polymerizates of the present invention is at least 45° C.

The dyeability test is conducted as follows: A dye solution is formed by dissolving 63.8 grams of RIT ® black no. 15 dye (CPC International Inc.) in 1900 milliliters of distilled water and stirring the solution vigorously while boiling for approximately one-half hour. The dye solution is poured into a stainless steel container (length: 25.4 centimeters; width: 10.2 centimeters; depth: 12.7 centimeters) which was placed in a constant temperature bath. A sample holder of stainless steel wire with holders to engage binder clips used to hold samples of polymerizates is employed to immerse samples in the dye solution.

In dyeing, the dye bath is brought to a temperature of 91.7°–94.4° C. (197°–202° F.), if necessary the level of the dye solution is restored to its original level by the addition of distilled water, any accumulations are scraped off the sides and bottom of the container, and the solution is stirred vigorously. The test samples and control samples are cleaned with warm aqueous soap solution, rinsed with a 50/50 2-propanol/water solution and thoroughly dried. After the luminous transmissions of the samples are determined, the samples are rewetted and immersed in the dye bath for 5 minutes. The samples are then removed from the dye bath and immediately immersed in a warm aqueous soap solution, rinsed with distilled water or a 50/50 2-propanol/water solution, and thoroughly dried. The luminous transmissions of the samples are determined. The samples are again rewetted and immersed in the dye bath for a further 5 minutes. After the samples are withdrawn from the dye bath, they are immersed in warm aqueous soap solution, rinsed, and dried as before. The luminous transmissions of the samples are determined.

The control samples are samples cut from a single sheet of polymer cast from diethylene glycol bis(allyl carbonate) monomer. Other samples from this sheet had been previously dyed according to the above procedure and, based upon the luminous transmissions observed, reference luminous transmission values of 92%, 43%, and 32% were assigned to the sheet after 0, 5, and 10 minutes dyeing time, respectively.

The observed transmissions of the test samples were corrected for variability from normal dyeing characteristics according to the following formula:

$$T = \frac{T_1 T_2 T_5}{T_3 T_4}$$

where:
  T = Corrected luminous transmission of test samples after designated immersion period, percent;
  $T_1$ = Observed luminous transmission of test sample after designated immersion period, percent;
  $T_2$ = Reference luminous transmission for no immersion period, percent;
  $T_3$ = Observed luminous transmission of test sample before immersion, percent;

$T_4$ = Observed luminous transmission of control sample after designated immersion period, percent;

$T_5$ = Reference luminous transmission for designated immersion period, percent.

The corrections are made through conversion from luminous transmission to luminous absorbance and then back to luminous transmission. These corrections serve to minimize the effects of variations in factors such as dye bath concentration, composition, and temperature and to place the results on a baseline provided by the reference luminous transmissions.

Ordinarily the polymerizates of the invention exhibit corrected luminous transmissions in the range of from about 5 to about 85 percent after being dyed for 10 minutes. In many cases the corrected luminous transmission is in the range of from about 10 to about 70 percent luminous transmission after being dyed for 10 minutes. Preferably the corrected luminous transmission is in the range of from about 15 to about 50 percent after being dyed for 10 minutes.

Chemical resistance is ascertained by immersing two specimens from a polymerizate sample in various liquids for about 30 minutes at room temperature. The specimens are then withdrawn from the liquid, wiped dry, and inspected visually.

The polymerizates usually can be readily machined using conventional techniques.

The invention is further described in conjunction with the following examples which are to be considered illustrative rather than limiting, and in which all parts are parts by weight and all percentages are percentages by weight unless otherwise specified.

EXAMPLE I

A solution was formed by admixing 72 parts of bisphenol A bis(allyl carbonate) monomer, 9 parts of triallyl cyanurate, 4.5 parts of diethylene glycol bis(allyl carbonate) monomer, and 1 part phthalic anhydride and heating the mixture at about 100° C. until all solids were dissolved. The solution was cooled to about ambient temperature.

A base solution was formed by admixing 10 parts of styrene, 3.5 parts of poly(ethylene glycol) dimethacrylate (the number average molecular weight of the poly(ethylene glycol) from which the dimethacrylate was prepared was about 200), 0.005 part of dioctyl phthalate, and 86.5 parts of the above solution. The base solution had a density at 25° C. of 1.1170 grams per cubic centimeter ($g/cm^3$) and a refractive index, $n_D^{20}$, of 1.5310.

A casting solution was formed by admixing 3 parts of diisopropyl peroxydicarbonate and 100 parts of the base solution.

A portion of the casting solution was charged into a glass mold constructed of two 31 centimeter × 31 centimeter glass plates separated by a pliable gasket that was 3.18 millimeters thick. The glass mold was held together by means of large binder clips. After filling the mold, it was placed in a hot air oven and exposed to the Standard Cure Cycle for Diisopropyl Peroxydicarbonate of Table 1. When the cure cycle was completed, the mold was removed from the oven and allowed to cool to room temperature. The resulting polymerizate was then removed from the mold. Various properties of the polymerizate are shown in Table 5.

TABLE 5

| | |
|---|---|
| Refractive Index, $n_D^{20}$ | 1.5600, 1.5608, 1.5604 |

TABLE 5-continued

| | |
|---|---|
| Abbe Number | 37.7, 37.2, 37.7 |
| Density at 25° C. | 1.217 $g/cm^3$ |
| Barcol Hardness | |
| 0-second | 38 |
| 15-seconds | 36 |
| Bayer Abrasion | Equivalent to poly(methacrylate) standard. |
| Chemical Resistance | |
| Acetone | No effect |
| Methylene Chloride | Pitted |
| 2-Propanol | No effect |
| Sulfuric Acid | Amber |
| n-Heptane | No effect |
| Toluene | No effect |
| Chloroform | Slightly pitted |
| 50% Aqueous NaOH | No effect |
| Luminous Transmission, percent (3.18 mm thickness) | 91.9 |
| Haze Value, percent (3.18 mm thickness) | 0.5 |
| Yellowness Index (3.18 mm thickness) | 1.5 |
| Luminous Transmission, percent After Dyeing (3.18 mm thickness) | |
| 5 min. in bath | 13 |
| 10 min. in bath | 3 |

Although the luminous transmission, haze value, yellowness index and the luminous transmissions after dyeing were determined on samples 3.18 millimeters thick rather than at a standard thickness of 2.2 millimeters, it is expected that the values obtained from samples of standard thickness would be very close to those measured because the luminous transmission is very high, indicating low internal absorption.

EXAMPLE II

Three casting solutions were each prepared by admixing 2,2'-dihydroxy-4-methoxybenzophenone ultraviolet light absorber (UVA), 3 parts of diisopropyl peroxydicarbonate, and 100 parts of the first base solution of Example I. A sheet of polymerizate was prepared from each solution according to the procedure of Example I. The amounts of ultraviolet light absorber used in preparing the casting solutions and various properties of the polymerizates are shown in Table 6.

TABLE 6

| | | | |
|---|---|---|---|
| UVA, parts | 0.01 | 0.025 | 0.05 |
| Barcol Hardness | | | |
| 0-second | 38 | 38 | 38 |
| 15-second | 36 | 37 | 37 |
| Luminous Transmission, percent (3.18 mm thickness) | 91.5 | 92.0 | 91.7 |
| Haze Value, percent (3.18 mm thickness) | 0.2 | 0.4 | 0.2 |
| Yellowness Index (3.18 mm thickness) | 1.6 | 2.0 | 2.7 |
| Luminous Transmission, percent After Dyeing (3.18 mm thickness) | | | |
| 5 min. in bath | 18 | 18 | 15 |
| 10 min. in bath | 6 | 6 | 6 |

The comment in Example I respecting deviation of the sample thickness from standard thickness is also applicable here.

EXAMPLE III

A mixture of 230.4 grams of bisphenol A bis(allyl carbonate) monomer and 28.8 grams of triallyl cyanurate was heated to 80° C. to dissolve the solids and form a solution which was cooled to about ambient temperature. To all of the cooled solution were added 32 grams of styrene, 14.4 grams of diethylene glycol bis(allyl carbonate) monomer, 11.2 grams of poly(ethylene glycol) dimethacrylate (same type as used in Example I), and 3.2 grams of phthalic anhydride. The resulting mixture was warmed to dissolve the solids and form a first base solution.

A second base solution was formed by adding 0.14 gram of 2-(2-hydroxy-5-tert-octylphenyl)benzotriazole ultraviolet light absorber to 140 grams of the first base solution and warming the mixture to dissolve the solids.

A third base solution was formed by admixing 40 grams of the second base solution and 40 grams of the first base solution.

A fourth base solution was formed by admixing 20 grams of the second base solution and 60 grams of the second solution.

First, second, third, and fourth casting solutions were formed by admixing 3 parts of diisopropyl peroxydicarbonate with 100 parts of each of the first, second, third, and fourth base solutions, respectively.

A portion of each of the casting solutions was charged into separate glass molds constructed of two glass plates separated by a pliable gasket that was 3.18 millimeters thick. The glass molds were held together by means of large binder clips. After filling the molds, they were heated in a hot air oven in the manner of Example I and then cooled to room temperature. The resulting polymerizates were then removed from the molds. Various properties of the polymerizates ascertained initially and after five and ten days exposure to ultraviolet light (UV) from a xenon source are shown in Table 7. In Table 7, the number of the polymerizate corresponds to the number of the casting solution from which it was produced, and the ultraviolet light absorber (UVA) content, expressed in percent, is one hundred times the weight ratio of the ultraviolet light absorber to the first base solution used in preparing the casting solution.

TABLE 7

| | Barcol Hardness | | Luminous Transmission percent (3.18 mm thickness) | Haze Value, percent (3.18 mm thickness) | Yellowness Index (3.18 mm Thickness) |
|---|---|---|---|---|---|
| | 0-sec. | 15-sec. | | | |
| First Polymerizate UVA Content: 0% UV Aging, days | | | | | |
| 0 | 41 | 38 | 92.0 | 0.5 | 1.4 |
| 5 | 38 | 37 | 91.9 | 0.5 | 5.2 |
| 10 | 42 | 41 | 91.8 | 0.6 | 6.2 |
| 17 | 42 | 42 | 91.2 | 0.8 | 7.8 |
| Second Polymerizate UVA Content: 0.1% UV Aging, days | | | | | |
| 0 | 38 | 34 | 92.1 | 0.3 | 1.7 |
| 5 | 33 | 31 | 92.5 | 0.6 | 1.4 |
| 10 | 37 | 36 | 92.5 | 1.0 | 1.5 |
| 17 | 37 | 37 | 92.6 | 1.3 | 1.5 |
| Third Polymerizate UVA Content: 0.05% UV Aging, days | | | | | |
| 0 | 39 | 37 | 92.0 | 0.5 | 1.6 |
| 5 | 41 | 40 | 92.4 | 1.0 | 1.6 |

TABLE 7-continued

| | Barcol Hardness | | Luminous Transmission percent (3.18 mm thickness) | Haze Value, percent (3.18 mm thickness) | Yellowness Index (3.18 mm Thickness) |
|---|---|---|---|---|---|
| | 0-sec. | 15-sec. | | | |
| 10 | 41 | 40 | 92.4 | 0.5 | 1.8 |
| 17 | 41 | 41 | 92.4 | 1.5 | 1.9 |
| Fourth Polymerizate UVA Content: 0.025% UV Aging, days | | | | | |
| 0 | 41 | 39 | 92.1 | 0.4 | 1.6 |
| 5 | 41 | 41 | 92.5 | 0.5 | 2.0 |
| 10 | 42 | 42 | 92.5 | 0.4 | 2.4 |
| 17 | 42 | 42 | 92.7 | 0.7 | 2.6 |

The comment in Example I respecting deviation of the sample thickness from standard thickness is also applicable here.

EXAMPLE IV

A first solution was prepared by dissolving 3.5 parts of phthalic anhydride in 100 parts of diethylene glycol bis(allyl carbonate) monomer.

A second solution was prepared by admixing 50 parts of styrene and 50 parts of the first solution.

A third solution was prepared by dissolving 2 parts of commercial divinylbenzene (60% divinylbenzene, 40% of a mixture of diethylbenzene and vinylethylbenzene) and 20 parts of triallyl cyanurate in 100 parts of the second solution.

A base solution was prepared by admixing 80 parts of bisphenol A bis(allyl carbonate) monomer and 20 parts of the third solution.

A casting solution was prepared by admixing 3 parts of diisopropyl peroxydicarbonate and 100 parts of the base solution.

A portion of the casting solution was charged into a glass mold constructed of two glass plates separated by a pliable gasket that was 2.2 millimeters thick. The glass mold was held together by means of large binder clips. After filling the mold, it was heated in a hot air oven in the manner of Example I and then cooled to room temperature. The resulting polymerizate was then removed from the mold. Various properties of the polymerizate are shown in Table 8.

TABLE 8

| Refractive Index, $n_D^{20}$ | 1.5602 |
|---|---|
| Barcol Hardness | |
| 0-second | 45 |
| 15-seconds | 38 |
| Yellowness Index | 1.4 |

EXAMPLE V

A first solution was prepared by dissolving 3.5 parts of phthalic anhydride in 100 parts of diethylene glycol bis(allyl carbonate) monomer.

A second solution was prepared by admixing 50 parts of parachlorostyrene and 50 parts of the first solution.

A third solution was prepared by admixing 1 part of commercial divinylbenzene, 3.5 parts of styrene and 100 parts of the second solution.

A fourth solution was prepared by dissolving 15 parts of triallyl cyanurate in 100 parts of bisphenol A bis(allyl carbonate) monomer.

A base solution was prepared by admixing 20 parts of the third solution and 80 parts of the fourth solution.

A casting solution was prepared by admixing 3 parts of diisopropyl peroxydicarbonate and 100 parts of the base solution. A polymerizate was formed from the casting solution using the procedure of Example IV. Various properties of the polymerizate are shown in Table 9.

TABLE 9

| Refractive Index, $n_D^{20}$ | 1.5620 |
|---|---|
| Barcol Hardness | |
| 0-second | 42 |
| 15-seconds | 39 |
| Yellowness Index | 1.4 |

EXAMPLE VI

A first solution was prepared by admixing 30.6 grams of bisphenol M bis(allyl carbonate) monomer, which is the bis(allyl carbonate) of 1,3-bis[1-(4-hydroxyphenyl)-1-methylethylidene]benzene, 0.4 gram of phthalic anhydride, and 3.6 grams of triallyl cyanurate and warming the mixture at 80° C. until all solids had dissolved. The first solution was then cooled to about room temperature.

A base solution was prepared by admixing 1.4 grams of poly(ethylene glycol) dimethacrylate (same type as used in Example I) and 4 grams of chlorostyrene (70% ortho; 30% para) with 34.6 grams of the first solution.

A casting solution was prepared by admixing 1.1 grams of diisopropyl peroxydicarbonate with 40 grams of the base solution. A polymerizate was formed from the casting solution using the procedure of Example I. Various properties of the polymerizate are shown in Table 10.

TABLE 10

| Refractive Index, $n_D^{20}$ | 1.5739, 1.5738 |
|---|---|
| Barcol Hardness | |
| 0-second | 44 |
| 15-seconds | 44 |
| Yellowness Index | 1.1 |

Although the present invention has been described with reference to specific details of certain embodiments thereof, it is not intended that such details should be regarded as limitations upon the scope of the invention except insofar as they are included in the accompanying claims.

We claim:

1. A pourable, polymerizable composition comprising:
   (a) aromatic-containing poly(allyl carbonate)-functional material comprising aromatic-containing bis(allyl carbonate)-functional monomer, aromatic-containing poly(allyl carbonate)-functional polymer, or a mixture thereof,
   (b) styrenic material, and
   (c) polyethylenic-functional monomer containing three or more ethylenically unsaturated groups selected from allyl, methallyl, acrylyl, and methacrylyl, wherein the weight ratio of said polyethylenic-functional monomer to all ethylenically unsaturated material present in said composition is in the range of from sbout 0.5:100 to about 25:100.

2. The pourable, polymerizable composition of claim 1 wherein the weight ratio of said aromatic-containing poly(allyl carbonate)-functional material to all ethylenically unsaturated material present in said composition is in the range of from about 25:100 to about 98.5:100 and the weight ratio of said styrenic material to all ethylenically unsaturated material present in said composition is in the range of from about 1:100 to about 20:100.

3. The pourable, polymerizable composition of claim 1 wherein said aromatic-containing poly(allyl carbonate)-functional material is aromatic-containing bis(allyl carbonate)-functional monomer represented by the formula

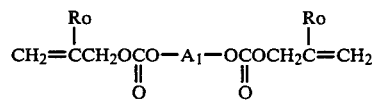

in which $A_1$ is the divalent radical derived from dihydroxy aromatic-containing material and each Ro is independently hydrogen or methyl.

4. The pourable, polymerizable composition of claim 3 wherein $A_1$ is represented by the formula

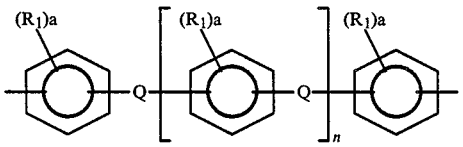

which each $R_1$ is independently alkyl containing from 1 to about 4 carbon atoms, phenyl, or halo; the average value of each a is independently in the range of from 0 to 4; each Q is independently oxy, sulfonyl, alkanediyl having from 2 to about 4 carbon atoms, or alkylidene having from 1 to about 4 carbon atoms; and the average value of n is in the range of from 0 to about 3.

5. The pourable, polymerizable composition of claim 4 wherein the average value of n is zero.

6. The pourable, polymerizable composition of claim 1 wherein said styrenic material comprises one or more compounds each being represented by the formula

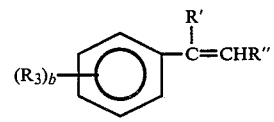

in which each $R_3$ is independently alkyl containing from 1 to about 4 carbon atoms, alkenyl containing from 2 to about 4 carbon atoms, halo, hydroxyl, carboxyl, alkyloxycarbonyl in which the alkyl portion contains from 1 to about 4 carbon atoms, alkoxy containing from 1 to about 4 carbon atoms, trihalomethyl, alkylsulfonyl containing from 1 to about 8 carbon atoms, cycloalkylsulfonyl containing from 3 to about 8 carbon atoms, phenylsulfonyl, alkoxysulfonyl containing from 1 to about 8 carbon atoms, cycloalkoxysulfonyl containing from 3 to about 8 carbon atoms, or phenoxysulfonyl; in which R' and R" are each independently hydrogen or halo; and in which the value of b is a whole number in the range of 0 to 5.

7. The pourable, polymerizable composition of claim 1 wherein said styrenic material comprises at least one compound represented by the formula

in which R'$_3$ is methyl, vinyl, chloro, or bromo, and the value of c is zero or one.

8. The pourable, polymerizable composition of claim 1 wherein said styrenic material comprises styrene, o-chlorostyrene, p-chlorostyrene, or a mixture thereof.

9. The pourable, polymerizable composition of claim 1 wherein said polyethylenic-functional monomer is selected from triallyl cyanurate, triallyl isocyanurate, triallyl 1,3,5-benzenetricarboxylate, triallyl 1,2,4-benzenetricarboxylate, acrylate ester having three or more acrylate groups, methacrylate ester having three or more methacrylate groups, allyl carbonate having three or more allyl carbonate groups, and mixtures thereof.

10. The pourable, polymerizable composition of claim 1 further comprising one or more of the following:
   (a) non-aromatic bis(allyl carbonate)-functional monomer,
   (b) non-aromatic poly(allyl carbonate)-functional polymer,
   (c) non-aromatic diester represented by the formula:

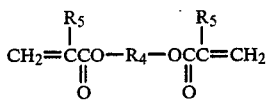

where R$_4$ is an aliphatic divalent organo group, a cycloaliphatic divalent organo group, or a divalent organo group consisting of at least one divalent aliphatic portion and at least one divalent cycloaliphatic portion, and where each R$_5$ is independently hydrogen, halo, or an alkyl group containing from 1 to about 4 carbon atoms,
   (f) monofunctional acrylate represented by the formula:

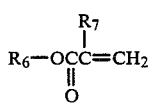

where R$_6$ is a monovalent organo group and R$_7$ is hydrogen, halo, or an alkyl group containing from 1 to about 4 carbon atoms,
   (g) phthalic anhydride,
   (h) aromatic diester represented by the formula

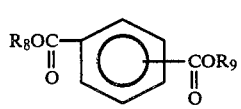

where R$_8$ and R$_9$ are each independently allyl, alkyl, or aralkyl.

11. The pourable, polymerizable composition of claim 10 which comprises said non-aromatic bis(allyl carbonate)-functional monomer wherein said non-aromatic bis(allyl carbonate)-functional monomer comprises diethylene glycol bis(allyl carbonate).

12. The pourable, polymerizable composition of claim 10 which comprises said non-aromatic diester wherein said non-aromatic diester is represented by the formula

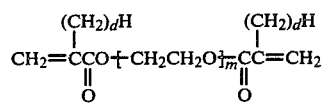

where the average value of m is in the range of from about 1 to about 20, and the average value of d is in the range of from 0 to 1.

13. The pourable, polymerizable composition of claim 1 which comprises:
   (1) aromatic-containing bis(allyl carbonate)-functional monomer represented by the formula:

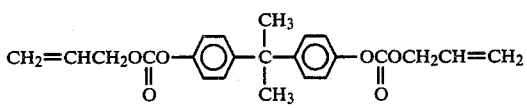

wherein the weight ratio of said aromatic-containing bis(allyl carbonate)-functional monomer represented by said formula to all ethylenically unsaturated material present in said composition is in the range of from about 25:100 to about 98.5:100;
   (2) styrenic material which comprises at least one compound represented by the formula:

in which R'$_3$ is methyl, vinyl, chloro, or bromo, and the value of c is zero or one, wherein the weight ratio of said styrenic material to all ethylenically unsaturated material present in said composition is in the range of from about 1:100 to about 20:100;
   (3) polyethylenic-functional monomer selected from triallyl cyanurate, triallyl isocyanurate, and mixtures thereof;
   (4) non-aromatic bis(allyl carbonate)-functional monomer which comprises diethylene glycol bis(allyl carbonate), wherein the weight ratio of said non-aromatic bis(allyl carbonate)-functional monomer to all ethylenically unsaturated material present in said composition is in the range of from about 0.1:100 to about 20:100;
   (5) non-aromatic diester represented by the formula:

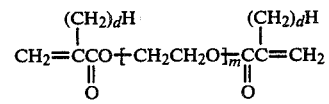

in which the average value of m is in the range of from about 4 to about 15 and the average value of d is in the range of from 0 to 1, wherein the weight ratio of said non-aromatic diester to all ethylenically unsaturated material present in said composition is in the range of from about 0.1:100 to about 20:100; and
   (6) phthalic anhydride, wherein the weight ratio of said phthalic anhydride to all ethylenically unsaturated material present in said composition is in the range of from about 0.05:100 to about 5:100.

14. The polymerizate produced by free-radically polymerizing the pourable, polymerizable composition of claim 1, said polymerizate having a 15-second Barcol hardness of at least zero, a yellowness index at a sample thickness of about 2.2 millimeters of about 4 or lower, and a refractive index at 20° C. and a wavelength of 589.3 nanometers of at least about 1.52.

15. The polymerizate produced by free-radically polymerizing the pourable, polymerizable composition of claim 2, said polymerizate having a 15-second Barcol hardness of at least zero, a yellowness index at a sample thickness of about 2.2 millimeters of about 4 or lower, and a refractive index at 20° C. and a wavelength of 589.3 nanometers of at least about 1.52.

16. The polymerizate produced by free-radically polymerizing the pourable, polymerizable composition of claim 3, said polymerizate having a 15-second Barcol hardness of at least zero, a yellowness index at a sample thickness of about 2.2 millimeters of about 4 or lower, and a refractive index at 20° C. and a wavelength of 589.3 nanometers of at least about 1.52.

17. The polymerizate produced by free-radically polymerizing the pourable, polymerizable composition of claim 4, said polymerizate having a 15-second Barcol hardness of at least zero, a yellowness index at a sample thickness of about 2.2 millimeters of about 4 or lower, and a refractive index at 20° C. and a wavelength of 589.3 nanometers of at least about 1.52.

18. The polymerizate produced by free-radically polymerizing the pourable, polymerizable composition of claim 5, said polymerizate having a 15-second Barcol hardness of at least zero, a yellowness index at a sample thickness of about 2.2 millimeters of about 4 or lower, and a refractive index at 20° C. and a wavelength of 589.3 nanometers of at least about 1.52.

19. The polymerizate produced by free-radically polymerizing the pourable, polymerizable composition of claim 6, said polymerizate having a 15-second Barcol hardness of at least zero, a yellowness index at a sample thickness of about 2.2 millimeters of about 4 or lower, and a refractive index at 20° C. and a wavelength of 589.3 nanometers of at least about 1.52.

20. The polymerizate produced by free-radically polymerizing the pourable, polymerizable composition of claim 7, said polymerizate having a 15-second Barcol hardness of at least zero, a yellowness index at a sample thickness of about 2.2 millimeters of about 4 or lower, and a refractive index at 20° C. and a wavelength of 589.3 nanometers of at least about 1.52.

21. The polymerizate produced by free-radically polymerizing the pourable, polymerizable composition of claim 8, said polymerizate having a 15-second Barcol hardness of at least zero, a yellowness index at a sample thickness of about 2.2 millimeters of about 4 or lower, and a refractive index at 20° C. and a wavelength of 589.3 nanometers of at least about 1.52.

22. The polymerizate produced by free-radically polymerizing the pourable, polymerizable composition of claim 9, said polymerizate having a 15-second Barcol hardness of at least zero, a yellowness index at a sample thickness of about 2.2 millimeters of about 4 or lower, and a refractive index at 20° C. and a wavelength of 589.3 nanometers of at least about 1.52.

23. The polymerizate produced by free-radically polymerizing the pourable, polymerizable composition of claim 10, said polymerizate having a 15-second Barcol hardness of at least zero, a yellowness index at a sample thickness of about 2.2 millimeters of about 4 or lower, and a refractive index at 20° C. and a wavelength of 589.3 nanometers of at least about 1.52.

24. The polymerizate produced by free-radically polymerizing the pourable, polymerizable composition of claim 11, said polymerizate having a 15-second Barcol hardness of at least zero, a yellowness index at a sample thickness of about 2.2 millimeters of about 4 or lower, and a refractive index at 20° C. and a wavelength of 589.3 nanometers of at least about 1.52.

25. The polymerizate produced by free-radically polymerizing the pourable, polymerizable composition of claim 12, said polymerizate having a 15-second Barcol hardness of at least zero, a yellowness index at a sample thickness of about 2.2 millimeters of about 4 or lower, and a refractive index at 20° C. and a wavelength of 589.3 nanometers of at least about 1.52.

26. The polymerizate produced by free-radically polymerizing the pourable, polymerizable composition of claim 13, said polymerizate having a 15-second Barcol hardness of at least zero, a yellowness index at a sample thickness of about 2.2 millimeters of about 4 or lower, and a refractive index at 20° C. and a wavelength of 589.3 nanometers of at least about 1.52.

* * * * *